US012566581B1

(12) United States Patent
Ghannam et al.

(10) Patent No.: US 12,566,581 B1
(45) Date of Patent: Mar. 3, 2026

(54) ADAPTIVE VISION ENHANCEMENT FOR DRIVERS WITH LEFT-RIGHT DISPARITIES OF EYESIGHT

(71) Applicant: FORD GLOBAL TECHNOLOGIES, LLC, Dearborn, MI (US)

(72) Inventors: Mahmoud Yousef Ghannam, Canton, MI (US); Rami Al Khatib, Dearborn, MI (US); Mansoor Nasir, Canton, MI (US); Aed M. Dudar, Canton, MI (US); John R. Van Wiemeersch, Novi, MI (US)

( * ) Notice: Subject to any disclaimer, the term of this patent is extended or adjusted under 35 U.S.C. 154(b) by 0 days.

(21) Appl. No.: 18/916,929

(22) Filed: Oct. 16, 2024

(51) Int. Cl.
G06F 3/14 (2006.01)
G06F 3/01 (2006.01)

(52) U.S. Cl.
CPC ............ G06F 3/1423 (2013.01); G06F 3/013 (2013.01)

(58) Field of Classification Search
CPC ............................... G06F 3/1423; G06F 3/013
See application file for complete search history.

(56) References Cited

U.S. PATENT DOCUMENTS

| | | | |
|---|---|---|---|
| 11,956,414 B2 | 4/2024 | Freeman et al. | |
| 12,001,605 B2 | 6/2024 | Yee et al. | |
| 12,042,294 B2 | 7/2024 | Krueger | |
| 2010/0103077 A1* | 4/2010 | Sugiyama | G02B 27/0172 340/425.5 |
| 2015/0035746 A1* | 2/2015 | Cockburn | G06F 3/011 345/156 |
| 2023/0120080 A1* | 4/2023 | Duffy | G06V 20/44 701/23 |
| 2023/0286437 A1* | 9/2023 | Stent | B60W 50/14 |
| 2024/0142781 A1* | 5/2024 | Yang | G06F 3/0304 |
| 2024/0157791 A1 | 5/2024 | Shmueli Friedland et al. | |

FOREIGN PATENT DOCUMENTS

JP          2023082919 A          6/2023

* cited by examiner

*Primary Examiner* — Brent D Castiaux
(74) *Attorney, Agent, or Firm* — Frank Lollo; Eversheds Sutherland (US) LLP

(57) ABSTRACT

An automotive transportation vehicle has a passenger cabin with a plurality of seating positions for respective persons to be seated. A display system in the vehicle has a plurality of display zones, wherein each display zone is visualizable along respective vectors from one or more of the seating positions. A dominant eye is identified for a particular occupant seated in a respective seating position when there is a differential vision preference between a right eye and a left eye of the particular occupant. Display content is generated to be displayed to the particular occupant. A display zone is selected for displaying the display content wherein the selected display zone corresponds to a respective vector from the seating position of the particular occupant matching the dominant eye of the particular occupant.

20 Claims, 6 Drawing Sheets

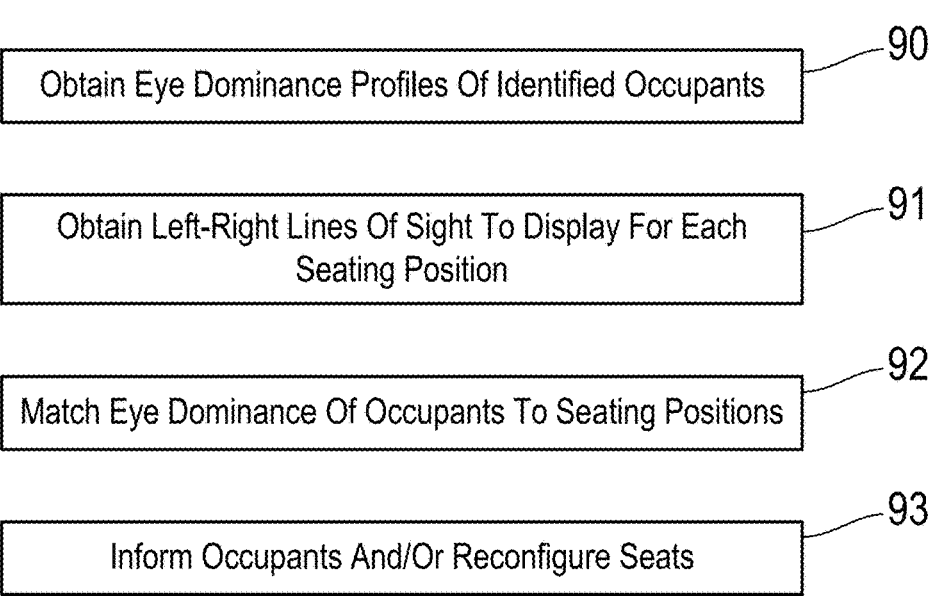

Obtain Eye Dominance Profiles Of Identified Occupants ⟍90

Obtain Left-Right Lines Of Sight To Display For Each Seating Position ⟍91

Match Eye Dominance Of Occupants To Seating Positions ⟍92

Inform Occupants And/Or Reconfigure Seats ⟍93

Fig. 11

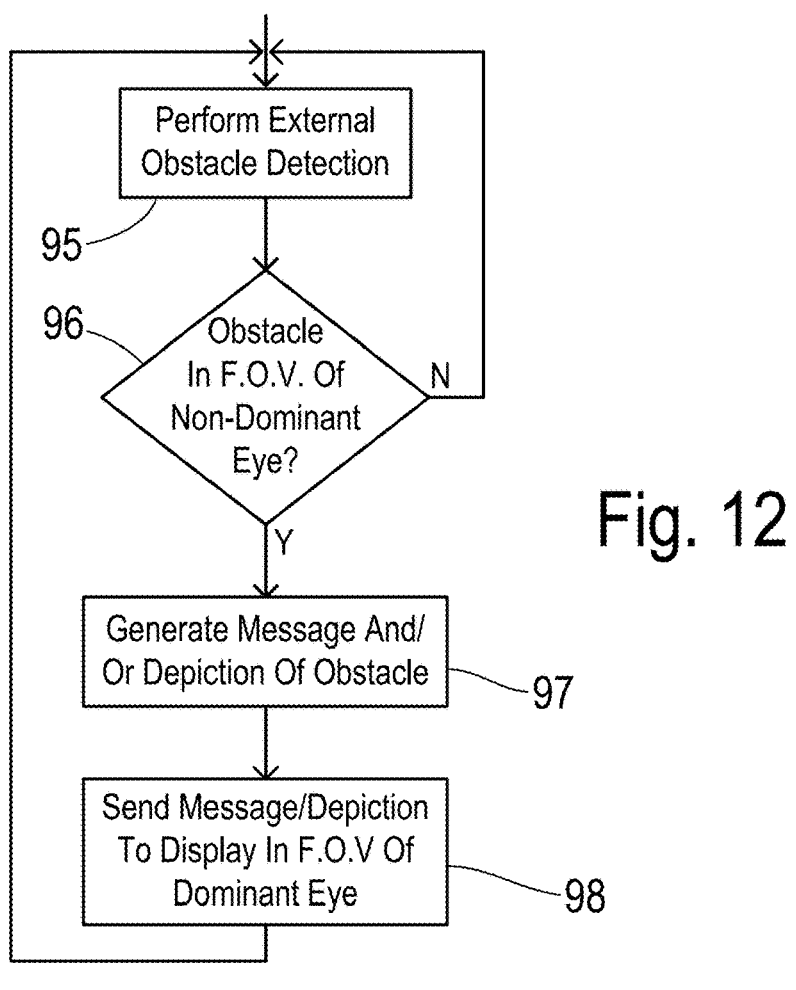

Perform External Obstacle Detection

95

Obstacle In F.O.V. Of Non-Dominant Eye?     N

96

Y

Generate Message And/Or Depiction Of Obstacle ⟍97

Send Message/Depiction To Display In F.O.V Of Dominant Eye ⟍98

Fig. 12

ADAPTIVE VISION ENHANCEMENT FOR DRIVERS WITH LEFT-RIGHT DISPARITIES OF EYESIGHT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to visual displays in automotive vehicles, and, more specifically, to enhancing presentation of visual information according to left/right vision disparities of a vehicle occupant.

Differences in visual acuity or strength between the left and right eyes of a person can lead to varying levels of clarity and ability to perceive details, which can make it difficult to accurately judge distances, read road signs, or detect potential hazards. Variations in the field of view between the eyes can result in narrower or wider blind spots, potentially reducing awareness of the environment in and around a vehicle. When these vision disparities between the eyes are perpetual, they might not be adequately addressed by traditional corrective lenses.

A difference in vision between the two eyes can result from various medical conditions, such as anisometropia or amblyopia. Some conditions may be temporary (e.g., eye fatigue, dry eye syndrome, allergies, medication, infections, or injury). Individuals with significant vision disparity sometimes develop coping strategies, such as relying more on their better eye or by using visual aids. However, these adaptations may not fully mitigate the challenges.

SUMMARY OF THE INVENTION

In one aspect of the invention, a transportation vehicle has a passenger cabin with a plurality of seating positions for respective persons to be seated. A display system is provided having a plurality of display zones, each display zone being visualizable along respective vectors from one or more of the seating positions. A vision classifier is responsive to a particular occupant seated in a respective seating position for identifying a dominant eye for the particular occupant when there is a differential vision preference between a right eye and a left eye of the particular occupant. An image source generates display content to be displayed to the particular occupant. A display manager is coupled to the image source and to the display system, wherein the display manager is configured to select a display zone for displaying the display content. The selected display zone corresponds to a respective vector from the seating position of the particular occupant matching the dominant eye of the particular occupant.

In another aspect of the invention, a method is provided for controlling a display system in a transportation vehicle, wherein the transportation vehicle has a passenger cabin with a plurality of seating positions for respective persons to be seated, wherein the display system has a plurality of display zones, and wherein each display zone is visualizable along respective vectors from one or more of the seating positions. The method identifies a dominant eye for a particular occupant seated in a respective seating position when there is a differential vision preference between a right eye and a left eye of the particular occupant. Display content is generated to be displayed to the particular occupant. A display zone is selected for displaying the display content wherein the selected display zone corresponds to a respective vector from the seating position of the particular occupant matching the dominant eye of the particular occupant.

BRIEF DESCRIPTION OF THE DRAWINGS

FIG. 11 is a flowchart showing a method for determining a seating arrangement.

FIG. 12 is a flowchart showing a method for displaying priority information relating to obstacles in or near a path of a vehicle.

DETAILED DESCRIPTION OF PREFERRED EMBODIMENTS

Figure 1:
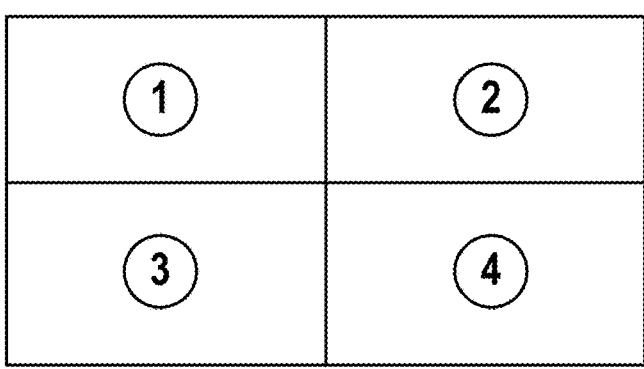
FIG. 1 depicts a visual field.

An adaptive in-vehicle vision distribution system is provided which can detect and counteract vision disparities between a user's eyes. In particular, the user may typically include a driver of the vehicle. Advanced sensors and cameras dynamically assess the user's visual acuity, field of view, and blind spot differences in real-time. In response, delivery of visual information is customized by intelligently distributing and adapting the display content across multiple in-vehicle screens or projection displays (e.g., heads-up displays or HUDs). The multiple screens and HUDs provide a range of display zones occupying different portions of a user's field of view. Redistribution of visual display content among the display zones is configured to compensate for imbalances in visual strength between the eyes, ensuring critical details are delivered to the stronger eye for clearer perception. The invention may leverage computational vision techniques to identify environmental elements falling within the user's blind spots or reduced visibility zones caused by field of view variations. The identified elements can then be strategically displayed within the zones (including dedicated blind spot screens or augmented reality projections within the driver's line of sight). Eye-tracking technology monitors the driver's or other occupant's gaze. Visual information delivery can be dynamically adjusted based on their current fixation point (i.e., point of focus).

The adaptive system ensures that intended visual information is presented within an optimal visual field, mitigating the impact of inter-ocular vision differences.

Disparity between the eyes can be automatically detected by analyzing several parameters such as gaze direction, eye movement and properties, head position, mirror usage, and driver behavior. Consistency of the gaze direction of one eye for focusing on the road or mirrors can be used to evaluate eye dominance. Checking the head position can be used to determine if the head is habitually turned to favor one eye. Mirror usage can reveal which eye is used predominantly when checking mirrors. During driving, particular behaviors and actions can suggest a dominant eye such as when the driver favors one side during turning of the vehicle. Eye glint and reflections (reflections from the corneal surface) can also determine a dominant eye. Eye movement and blinking patterns can be examined, wherein the frequency and pattern of eye movements and blinking can be associated with eye dominance according to models of such behavior. In some cases, it may be determinable that one eye is nonfunctional (e.g. blind or missing), leading to the conclusion that the other eye is the dominant one.

Temporary eye problems can be detected, such as use of an eye patch, pupil dilation following an eye exam, dry eye, or broken or misplaced eyeglasses or contact lenses. These conditions can be detected automatically or can be triggered manually by a user. In addition to redistributing display content, display parameters (e.g., brightness) can be adjusted to reduce eye strain.

Differential vision preference (e.g., right eye or left eye dominance) can be manually input by a user or determined automatically. In either case, a user profile can be established and augmented over time to enhance detection accuracy. For example, users can manually input their preference for a dominant eye, which can be stored in their profile. Stored user profiles can be saved in or shared via the cloud or local network, enabling seamless transfer between vehicles.

The invention may utilize advanced eye-tracking sensors, computational vision algorithms, and dynamic head-up display (HUD) technology to provide a seamless and immersive visual experience. The user's gaze can be continuously monitored to assesses visual acuity, field of view, and blind spot differences between the eyes in real-time. Based on the detected vision imbalances, visual information is intelligently redistributed across multiple in-vehicle displays and/or HUDs. Predetermined information may be prioritized for display within the stronger eye's field of view, such as important vehicle operating parameters or driver assistance messages or images (i.e., advisories). Dynamically positioning the priority content to align with the dominant eye's line of sight, clarity and perception can be optimized. In some embodiments, object detection and environmental mapping techniques can identify objects or images falling within the user's blind spots or nondominant field of view. These objects/images can be strategically displayed within the dominant line of sight. For example, in the case of a user with macular degeneration wherein vision in the center of their visual field is reduced, vehicle cameras tracking the user's gaze can be used to capture content at the center of the field of view which can then be reproduced in the lower display zone of the vehicle displays.

In some embodiments, eye-tracking continuously monitors the driver's point of focus. As the driver's gaze shifts, the visual information delivery on the HUD and display screens is adjusted to reposition particular content to align with the dominant eye's current line of sight, ensuring that crucial details are always presented within the optimal visual field. Exterior sensors such as a front radar can monitor for obstacles or markers in or near the vehicle's path so that corresponding visual information can be displayed in a display zone aligned with the dominant eye's field of view (e.g., for driver assistance features such as lane keeping, parking support, or collision warning). The invention is applicable to non-driving occupants (i.e., passengers) having differential vision conditions, such that corresponding display content is distributed to target display zones appearing in the dominant eye's field of view.

In some embodiments, a strategy can be used to manage a seating arrangement of multiple people with differential vision preferences sharing a vehicle. For example, occupants having a dominant right eye may be seated on one side of a display screen or HUD, with other occupants having a dominant left eye seated on the other side of the screen/HUD. An optimal arrangement can be determined automatically and communicated to the occupants who seat themselves accordingly. When in an autonomous vehicle having adjustable seat orientations, particular occupants in existing seat locations can be rotated to have their dominant eye face toward a particular display. In some embodiments, a seating arrangement can be determined to generally protect a dominant eye from solar glare or other stray sources of brilliant illumination. For example, with glare coming from one side of the vehicle, an occupant can be seated such that their nondominant eye is oriented toward the glare and the dominant eye is shielded from the glare and better able to see the display content. When particular types of glass are present for various ones of the vehicle windows or windshield (e.g., tinted, anti-glare, laminated, tempered, anti-reflection), then these can also be taken into account when determining seating locations optimized for the vision preferences of an occupant.

Figures 2, 3:
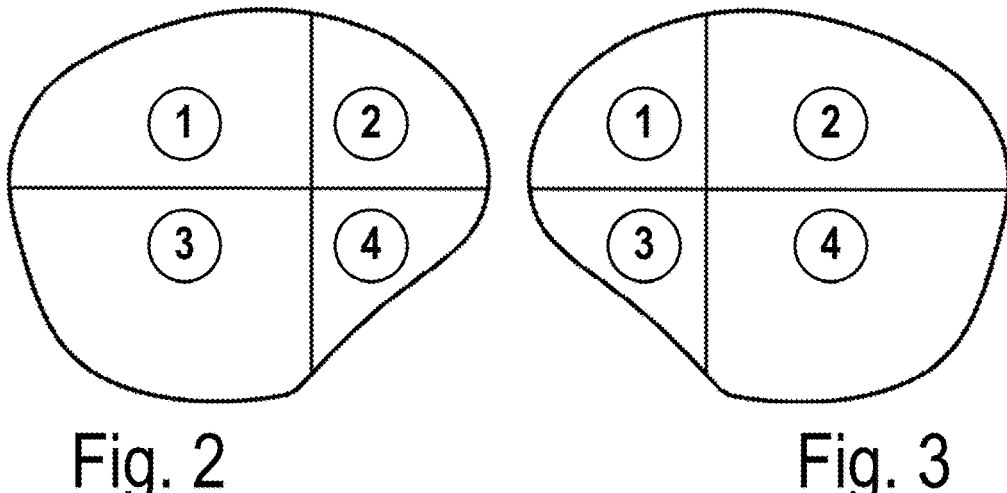
FIGS. 2 and 3 show mapping of the visual field onto the retinas of the left and right eye, respectively.
Figure 4:
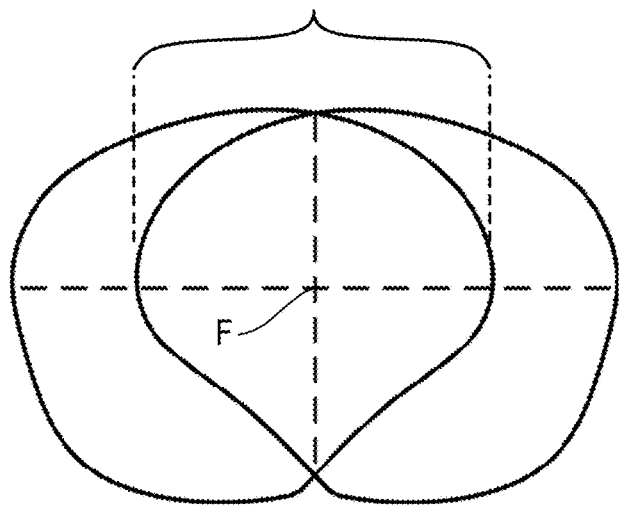
FIG. 4 shows overlapping of the left and right visual fields according to a fixation point.

Referring to FIG. 1, a visual scene toward which a gaze is directed has quadrants 1 through 4. FIG. 2 maps quadrants 1 through 4 onto the retinal vision of a user's left eye, and FIG. 3 maps quadrants 1 through 4 onto the retinal vision of a user's right eye. In normal vision, the left and right fields of view combine such that a fixation point F (intersection point of the quadrants) coincides in the overlapping left and right fields of view. When there is a differential vision preference between the left and right eyes resulting from a condition rendering one eye as dominant over the other, there is much to be gained by presenting images (graphical, pictorial, or text images) which are preferentially placed for the dominant eye.

Figure 5:
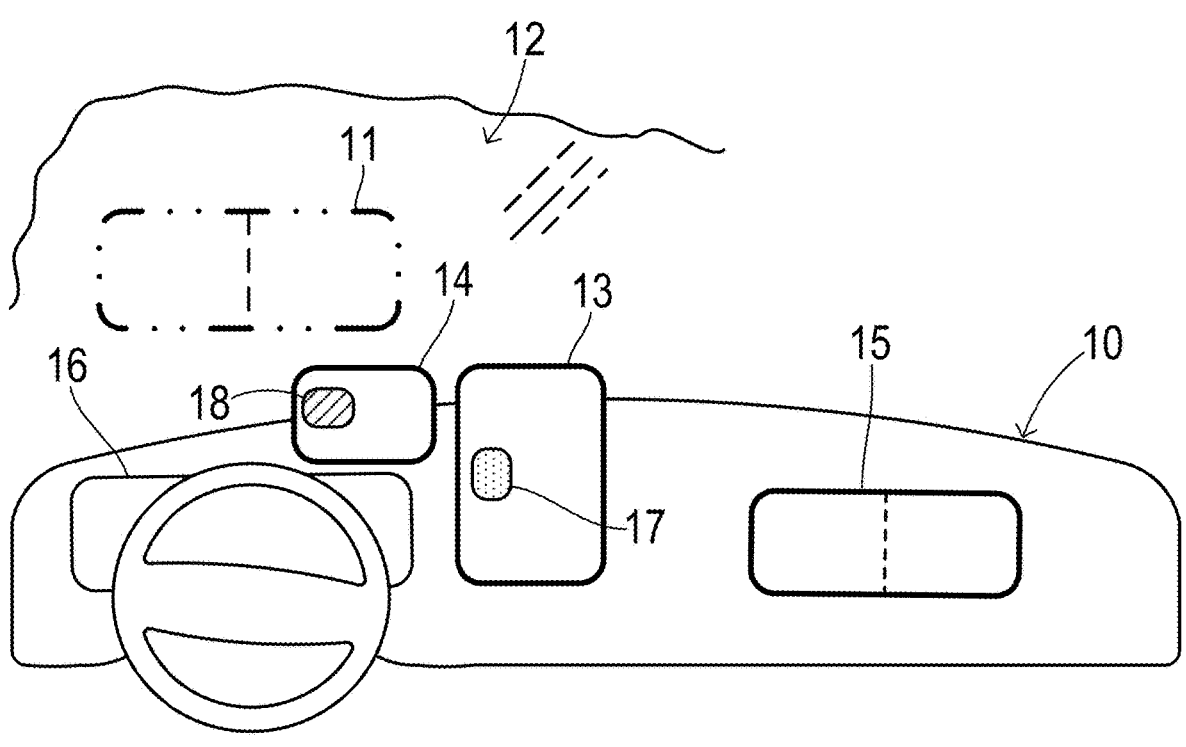
FIG. 5 is a schematic diagram showing a vehicular layout of a plurality of visual displays providing a plurality of display zones arrayed across a visual field of an occupant of the vehicle (e.g., driver).

FIG. 5 shows an instrument panel 10 within a passenger cabin of a vehicle. A display system in the passenger cabin includes a plurality of display screens/head-up displays, especially on or near instrument panel 10 for use by a driver of the vehicle seated in a driver seat (not shown). The display system includes a heads-up display 11 which is projected onto a front windshield 12 and a plurality of monitor screens (e.g., touchscreen display panels) 13-16. Individual displays may typically further include separately addressable portions which can be selected to generate display content at respective spatial locations. As a result of the outspreading of monitors/displays, a plurality of respective display zones are available for displaying various images, icons, or text at diverse locations with respect to a field of view of the vehicle occupant (e.g., driver). For example, display zones 17 and 18 are provided by separately addressable portions of screens 13 and 14, respectively. HUD 11 and monitor screen 15 can be considered to have left and right halves which can act as separate display zones by formatting particular display content such that an item of interest falls up a selected side of the displays. In some instances, a display zone may correspond to an entire monitor screen which may correlate with a right or left eye of a particular occupant because of the relative location of their seat (e.g., screen 15 tending toward the right eye of a driver and screen 16 tending toward the left eye of a passenger seated next to the driver).

Figure 6:
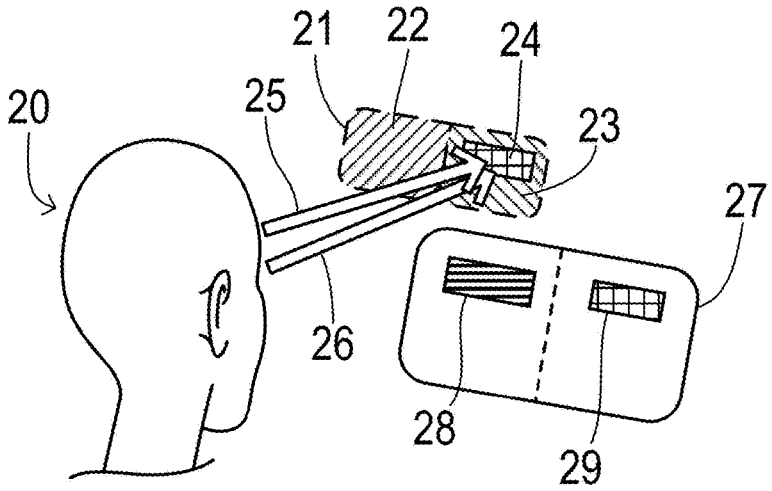
FIG. 6 is a schematic diagram showing visual vectors of an occupant toward various displays presenting various display zones potentially falling within a field of view of a dominant eye of the occupant.

Each display zone is visualizable from each respective seating position (e.g., driver seat, passenger seat) along a respective vector for each of their eyes. Each display zone is thus seen from each seat along a different vector, and for any particular seating position there is a respective vector along which the person in that seating position sees the respective display zone using each of their eyes. When a particular occupant has a differential vision preference, the respective vector to consider for purposes of improving visibility is the vector based on the dominant eye. FIG. 6 shows an occupant 20 looking toward an HUD 21 with a left half 22 and a right half 23. Display content 24 is being projected by HUD 21 as a display zone 24 which appears at a particular location. From the seating position of occupant 20, display zone 24 can be gazed upon along a left-eye vector 25 and a right-eye vector 26.

During vehicle movement, a driver's gaze may normally scan the road ahead and the environment inside and outside the passenger cabin (including the display screens or HUD). When there is a dominant right or left eye of the occupant, then utilizing display zones situated toward the same right or left side of the average gaze direction can enhance the ability of the occupant to accurately and quickly perceive the displayed content. In some circumstances, it is desired to highlight certain information to the occupant (e.g., driver) at a higher priority than other information. Priority information may include vehicle operating parameters and/or instructions, depictions, or other advisories relating to driver assistance systems. The higher priority display content can be distributed to display zones for which the respective vectors are a match with the dominant eye (e.g., a dominant right eye results in priority usage of display zones to the driver's right, such as display zone 24 of HUD 21 and a display zone 29 of a monitor screen 27). In some embodiments, selection of the display zone can be based on a neutral (e.g., time averaged) gaze direction. Further enhancement can be obtained in other embodiments by using real-time tracking of the gaze direction and selecting the display zones toward the dominant side of the current gaze direction (e.g., either display zone 28 on the left side of screen 27 or display zone 29 on the right side of screen 27 might be selected for displaying some priority content depending on where a current gaze point lies with respect to the zones).

Figure 7:
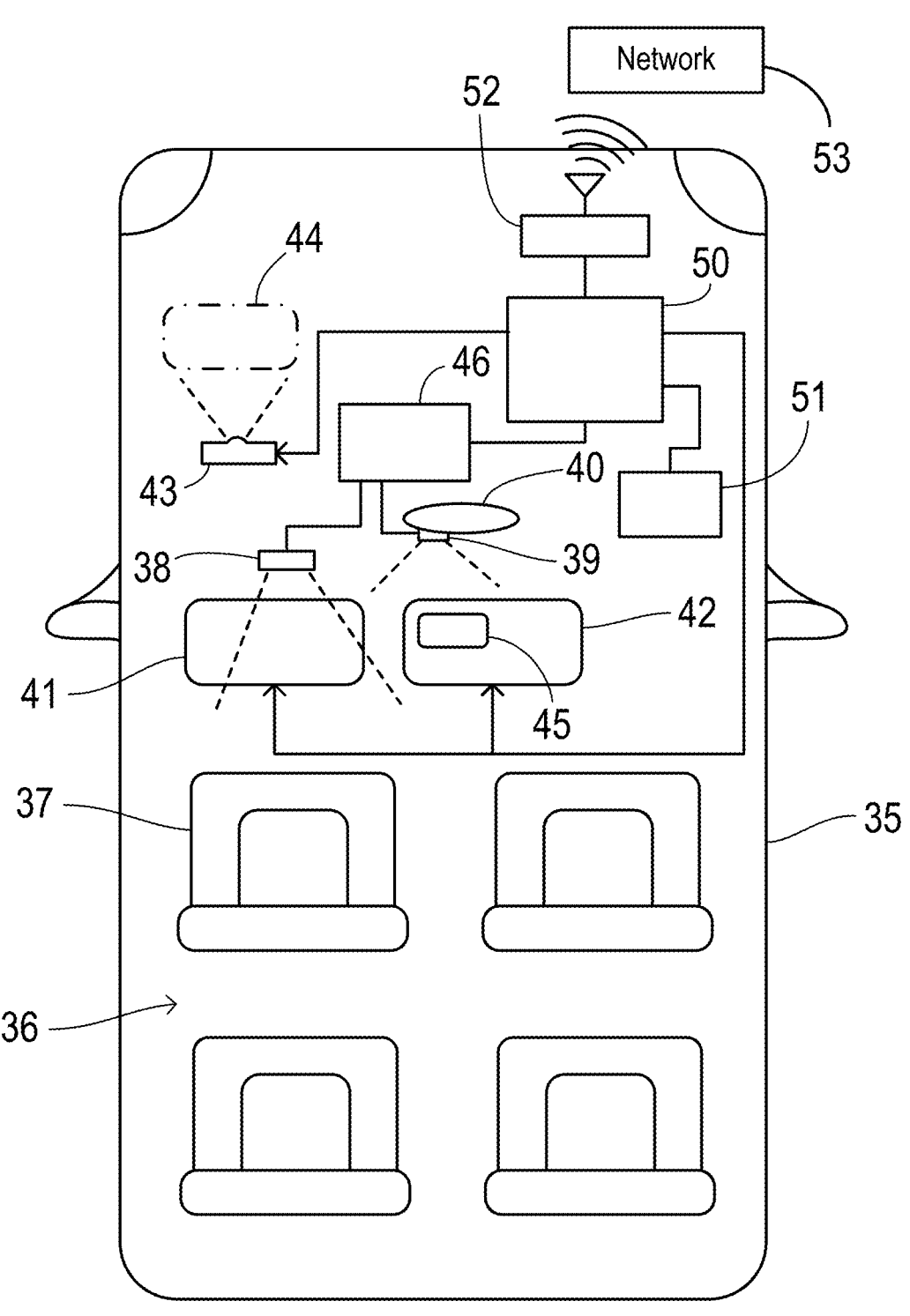
FIG. 7 is a block diagram showing an automotive transportation vehicle according to one embodiment.

FIG. 7 shows a vehicle 35 in greater detail. A passenger cabin 36 includes a driver seat 37 and a plurality of passenger seats. The driver and/or occupants can be monitored using cameras/image sensors 38 and 39 (e.g., mounted on a rearview mirror 40) which may use visible and infrared imaging for tracking the eyes and other physical features. A display system includes display screens 41 and 42 and an HUD projector 43 which generates a heads-up image 44. The dispersal of displays 41, 42, and 44 (together with separately addressable display portions such as portion 45) creates a plurality of display zones. For each of the seating positions provided by driver seat 37 and the passenger seats, each potential display zone has an associated vector (i.e., line segment directed from the display zone to the corresponding eye of an occupant). Selection of a display zone is based on obtaining a vector that places the display zone into the preferential field of view of the occupant's dominant eye.

Vehicle 35 includes a gaze tracking unit 46 configured to monitor the driver in driver's seat 37 (and/or other occupants in other seats) using methods known in the art. Various monitored parameters such as gaze point, gaze direction, and pupil size are reported by gaze controller 46 to a display controller 50.

Controller 50 is connected to a controller network 51 (e.g., including a multiplex communication bus interconnecting various modules such as a powertrain control module, a body control module, and an obstacle detection module) which provides access to vehicle operating parameters such as transmission gear selection, vehicle speed, location of obstacles in or near the vehicle's path, or other information, which may provide display contents to be projected to the driver/occupants and which may be utilized in analyzing driver behaviors, for example.

Controller 50 is further coupled to a telematics module 52 having a wireless transceiver such as a cellular modem to exchange data/communication signals with a remote network 53. Using network 53, vision profile(s) created or augmented at any particular vehicle can be shared with other vehicles for use when a corresponding person moves from one vehicle to another.

Figure 8:
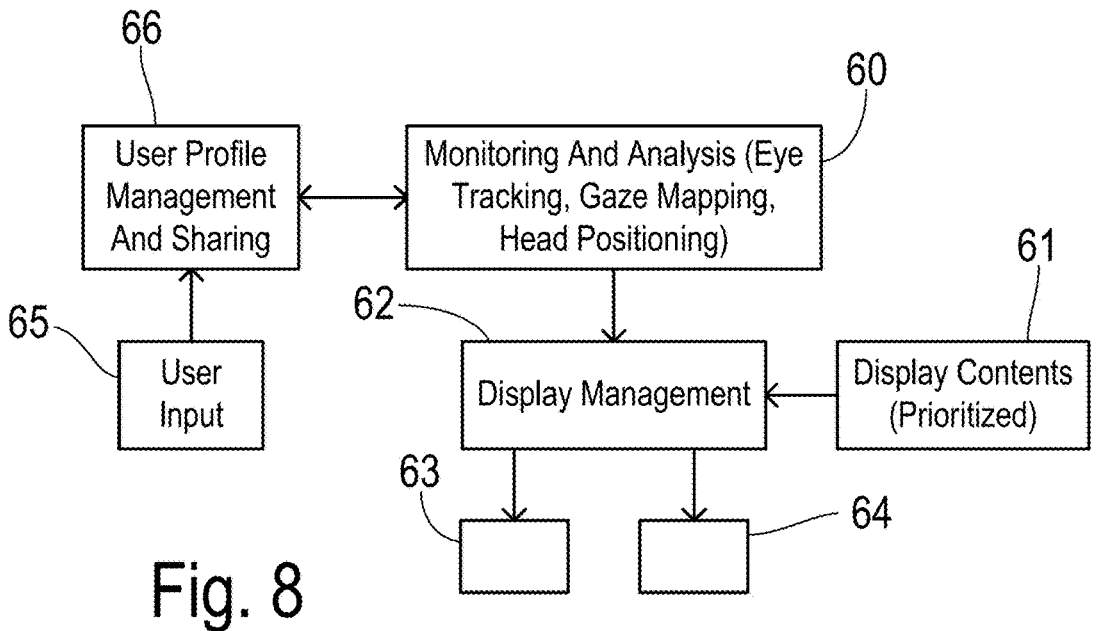
FIG. 8 is a block diagram showing components of the invention in greater detail.

Display controller 50, gaze controller 46, and other supporting modules in controller network 51 may act in concert to generate the components of a control framework as shown in FIG. 8. A monitoring and analysis block 60 may perform eye tracking, gaze mapping, and/or head position monitoring for the purpose of identifying a dominant eye for particular occupants in the vehicle (e.g., whenever that occupant possesses a differential vision preference between their right and left eye). Monitoring may preferably be performed using interior cameras or other image sensors using visible and/or infrared light. One or more occupants are identified and tracked according to the particular seat position where each occupant is located. A plurality of display contents 61 are generated as known in the art to convey various information, text, or images to a driver or occupant of the vehicle. The display contents may include items which should be prioritized according to any desired criteria, especially in the case of a driver to whom certain information may need to be urgently presented (e.g., a change in operating parameters of the vehicle or the presence of obstacles in the path of the vehicle). The display contents 61 are provided to a display management block 62 which receives the identified dominant eye of at least one driver or occupant for whom images or information are being displayed. Display management block 62 optimizes a placement of the images or information for viewing by the dominant eye by virtue of selecting an appropriate display zone which is best seen based on the identity of the dominant eye. More specifically, a display zone 63 or 64 is selected according to whichever display zone has an associated vector (i.e., line of sight from the eyes of the occupant to the respective display zone) which best matches the field of view of the dominant eye of the occupant.

A user input 65 is provided to enable a user to specify a dominant eye preference via an HMI or other input means. A corresponding user profile can be created in a user profile block 66, based on either the user input or an automatic detection by a vehicle controller. User profile block 66 may be an electronic storage and management system which compiles and shares vision profiles for one or more users. User profile block 66 may provide preexisting user profiles to monitoring and analysis block 60, while block 60 can provide augmented or updated profiles back to profile block 66.

Figure 9:
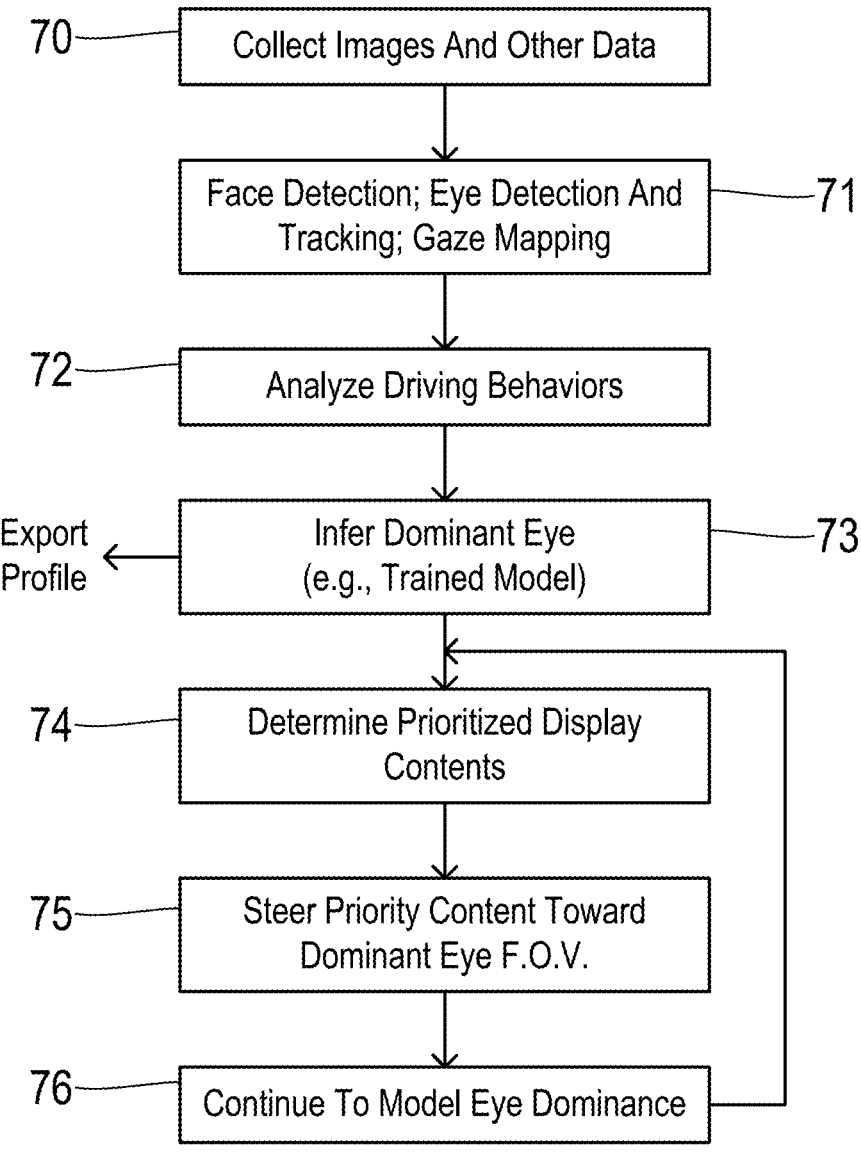
FIG. 9 is a flowchart showing one preferred method of the invention.

FIG. 9 shows one preferred embodiment of a method for controlling a display system in a transportation vehicle, wherein camera images and/or other data relating to a vision behavior pattern of a vehicle occupant is collected in step 70. Using the collected images and data, known methods of face detection, eye detection, eye tracking, and/or gaze mapping are performed in step 71. In step 72, behaviors of the occupant are recorded and analyzed such as gaze direction or head position during certain activities such as steering the vehicle, scanning the roadway, looking into a rearview mirror, or looking at particular display panels. Based on the eye tracking, gaze mapping, and monitored behaviors, a dominant eye may be inferred in step 73 using a trained model or other analysis system. A vision profile of the particular user may be compiled and then exported in step 73, if desired. In step 74, prioritized display contents are selected within the full set of display contents which are being fed to a display system. Priority content within the display contents are steered in step 75 toward the field of view of the dominant eye. In particular, a comparison may be made between all the available display zones which might receive the priority content and the current or expected field-of-view for the dominant eye in order to select the best display zone for the display content. In step 76, the differential vision may be continued to be modeled in order to further refine a user vision profile. Then a return is made to step 74 to continue directing priority display contents to the dominant eye's field-of-view.

Figure 10:
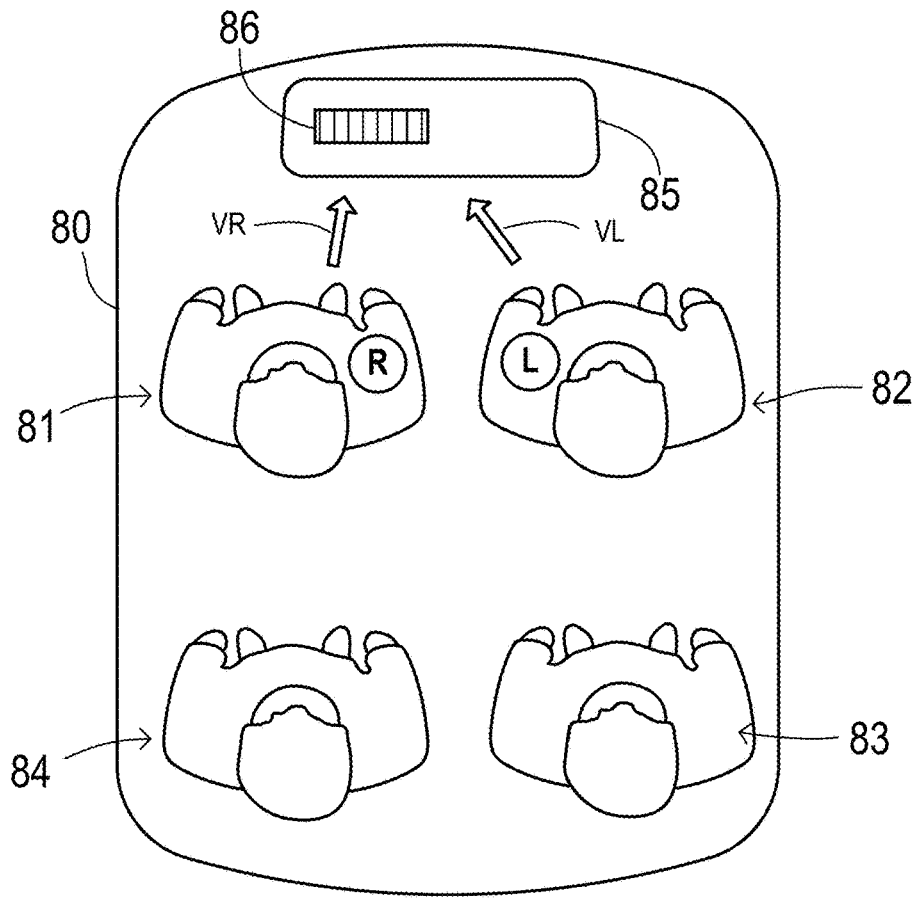
FIG. 10 is a schematic diagram showing a seating arrangement for optimizing the views for vehicle occupants having respective vision disparities.

In some embodiments, as shown in FIG. 10, a seating arrangement of vehicle occupants can be optimized such that the dominant eyes of a plurality of the occupants can be simultaneously utilized to obtain optimal visibility by aligning the displayed contents with the vision preferences of multiple occupants at the same time. Thus, a vehicle passenger compartment 80 includes occupants 81-84 in respective seating positions. Front seat occupants 81 and 82 are presented with a front display panel 85 which is fully in view of both occupants. Occupant 81 has a right eye dominance and occupant 82 has a left eye dominance. With the occupants arranged side by side as shown, display 85 has a display zone 86 which may coincide with a preferential line of sight for both occupants 81 and 82. Based on a right eye dominance of occupant 81, a vector VR corresponds to a preferred line of sight for occupant 81. Likewise, a vector VL corresponds to a preferred line of sight for occupant 82. Display zone 86 matches both respective vectors, enabling simultaneous presentation of prioritized display contents using display zone 86 for both occupants 81 and 82.

Once a vision classifier detects the identities of occupants 81 and 82, it may detect the possibility of a seating arrangement which improves vision of priority display contents for both users 81 and 82 simultaneously. Accordingly, steps can be taken to inform the users of a preferred seating arrangement. When automatically reconfigurable seating is present, steps can be taken to automatically implement a particular arrangement using an appropriate reconfiguration of seat positions.

FIG. 11 shows a flowchart of a method for optimizing seating arrangements wherein eye dominance profiles are obtained in step 90 for each of the identified occupants entering (or already residing within) a vehicle passenger compartment. In step 91, available lines of sight to various display zones are obtained from each seating position to each of the available display zones. Eye dominance of the identified occupants are matched to the available lines of sight on a seat by seat basis, in order to find the seating positions which can simultaneously satisfy the needs of a plurality of the occupants to simultaneously view the same display zone in their preferred field-of-view. In step 93, the occupants are informed of the preferred seating arrangement or the seats may be reconfigured in the event that they can be rotated or otherwise moved (the such as in an autonomous vehicle with powered seating reconfiguration devices).

In some embodiments of the invention, priority display contents may be derived based on external obstacles in or near the pathway of the vehicle. The invention can help ensure that a driver is quickly advised of the obstacle. As shown in FIG. 12, external obstacle detection is regularly performed in step 95 during times when a vehicle is being driven, using known systems and methods such as radar, lidar, or external camera monitoring. A check is performed in step 96 to determine whether a detected obstacle is located in a field of view of a nondominant eye of the driver. If not, then a return is made to step 95. When an obstacle falls in the field-of-view of the nondominant eye then actions may be taken in order to generate corresponding display contents in the field-of-view of the dominant eye, thereby bringing an unseen or less visible obstacle to the attention of the driver. An advisory message and/or a depiction of the obstacle may be generated in step 97. The message or depiction are displayed within the field-of-view of the dominant eye in step 98 by selecting a display zone aligned with the dominant line of sight. The prioritized display content can include a graphic depiction of identified obstacles, alert icons, or textual messages being sent to the appropriate display zone.

What is claimed is:

1. A transportation vehicle comprising:

a passenger cabin having a plurality of seating positions for respective persons to be seated;

a display system having a plurality of display zones, each display zone being visualizable along respective vectors from one or more of the seating positions;

a vision classifier responsive to a particular occupant seated in a respective seating position for identifying a dominant eye for the particular occupant when there is a differential vision preference between a right eye and a left eye of the particular occupant;

a memory storing a vision profile for the particular occupant, the vision profile including the differential vision preference of the particular occupant;

an image source generating display content to be displayed to the particular occupant; and a display manager coupled to the image source and to the display system, wherein the display manager is configured to select a display zone for displaying the display content wherein the selected display zone corresponds to a respective vector from the seating position of the particular occupant matching the dominant eye of the particular occupant.

2. The transportation vehicle of claim 1, wherein the display content comprises priority content for highlighting to the particular occupant.

3. The transportation vehicle of claim 2, wherein the priority content is comprised of vehicle operating parameters.

4. The transportation vehicle of claim 2, wherein the priority content is comprised of driver assistance advisories.

5. The transportation vehicle of claim 1, wherein the plurality of display zones are comprised of a heads-up display, separately addressable portions of a monitor screen, or a plurality of monitor screens or heads-up displays.

6. The transportation vehicle of claim 1, further comprising a user input coupled to the vision classifier for manual input of the differential vision preference of the particular occupant.

7. The transportation vehicle of claim 1, further comprising:

an occupant monitor coupled to the vision classifier and including an image sensor capturing images of the particular occupant;

wherein the vision classifier is configured for (1) tracking the right eye and the left eye of the particular occupant, (2) determining a gaze direction during operation of the transportation vehicle, and (3) identifying the dominant eye according to the gaze direction coinciding with predetermined actions of the particular occupant.

8. The transportation vehicle of claim 1, further comprising:

an external obstacle detector adapted to identify obstacles along a movement path of the transportation vehicle;

wherein the image source responds to the obstacle detector to generate the display content according to the identified obstacles, wherein the display content includes a graphic depiction of the identified obstacles, alert icons, or textual messages sent to the selected display zone.

9. The transportation vehicle of claim 1, wherein the vision classifier identifies dominant eyes for a plurality of occupants, and wherein the transportation vehicle further comprises:

a seating manager determining a seating arrangement of the plurality of occupants wherein a single display zone matches respective vectors correlating to the dominant eyes of the plurality of occupants.

10. The transportation vehicle of claim 1, further comprising:

a telematics module for sharing the vision profile with another transportation vehicle.

11. A method of controlling a display system in a transportation vehicle, wherein the transportation vehicle has a passenger cabin with a plurality of seating positions for respective persons to be seated, wherein the display system has a plurality of display zones, wherein each display zone is visualizable along respective vectors from one or more of the seating positions, the method comprising the steps of:

identifying a dominant eye for a particular occupant seated in a respective seating position when there is a differential vision preference between a right eye and a left eye of the particular occupant;

storing a vision profile for the particular occupant, the vision profile including the differential vision preference of the particular occupant;

generating display content to be displayed to the particular occupant; and selecting a display zone for displaying the display content wherein the selected display zone corresponds to a respective vector from the seating position of the particular occupant matching the dominant eye of the particular occupant.

12. The method of claim 11, wherein the display content comprises priority content for highlighting to the particular occupant.

13. The method of claim 12, wherein the priority content is comprised of vehicle operating parameters.

14. The method of claim 12, wherein the priority content is comprised of driver assistance advisories.

15. The method of claim 11, wherein the plurality of display zones are comprised of a heads-up display, separately addressable portions of a monitor screen, or a plurality of monitor screens or heads-up displays.

16. The method of claim 11, wherein the step of identifying a dominant eye is comprised of collecting user input of the differential vision preference of the particular occupant.

17. The method of claim 11, wherein the step of identifying a dominant eye is comprised of:

capturing images of the particular occupant;

tracking the right eye and the left eye of the particular occupant;

determining a gaze direction during operation of the transportation vehicle; and identifying the dominant eye according to the gaze direction coinciding with predetermined actions of the particular occupant.

18. The method of claim 11, further comprising the step of using an external obstacle detector adapted to identify obstacles along a movement path of the transportation vehicle;

wherein the generated display content includes a graphic depiction of the identified obstacles, alert icons, or textual messages sent to the selected display zone.

19. The method of claim 11, further comprising the steps of:

identifying dominant eyes for a plurality of occupants;

determining a seating arrangement of the plurality of occupants wherein a single display zone matches respective vectors correlating to the dominant eyes of the plurality of occupants; and informing the plurality of occupants of the seating arrangement.

20. The method of claim 11, further comprising the steps of:

sharing the vision profile with another transportation vehicle.

\* \* \* \* \*